United States Patent [19]

Laverty

[11] 4,027,573
[45] June 7, 1977

[54] SELF-TAPPING SCREW FASTENER WITH IMPROVED THREAD CONSTRUCTION

[75] Inventor: Richard C. Laverty, Palatine, Ill.

[73] Assignee: Interior Fasteners, Inc., Elk Grove Village, Ill.

[22] Filed: June 20, 1975

[21] Appl. No.: 588,964

[52] U.S. Cl. .................................. 85/46; 85/47
[51] Int. Cl.² .................................... F16B 33/02
[58] Field of Search .................. 85/41, 46, 47, 48

[56] References Cited

UNITED STATES PATENTS

| 408,531 | 8/1899 | Rogers | 85/46 |
|---|---|---|---|
| 449,887 | 4/1891 | Rogers | 85/46 |
| 684,774 | 10/1901 | Baggs | 85/47 |
| 1,827,615 | 10/1931 | Rosenberg | 85/41 |
| 2,382,019 | 8/1945 | Miller | 85/46 X |
| 3,124,408 | 3/1964 | Oestereicher | 85/47 X |
| 3,207,023 | 9/1965 | Knohl | 85/46 |
| 3,703,843 | 11/1972 | Laverty | 85/46 |
| 3,861,269 | 1/1975 | Laverty | 85/46 |
| 3,902,399 | 9/1975 | Yotti | 85/46 |
| 3,942,405 | 3/1976 | Wagner | 85/46 |

FOREIGN PATENTS OR APPLICATIONS

| 16,765 | 1890 | United Kingdom | 85/41 |
|---|---|---|---|
| 162,148 | 4/1921 | United Kingdom | 85/41 |
| 1,120,991 | 7/1968 | United Kingdom | 85/47 |

Primary Examiner—Roy D. Frazier
Assistant Examiner—Thomas J. Holko
Attorney, Agent, or Firm—Ray E. Snyder

[57] ABSTRACT

A screw fastener formed with improved thread construction adapted to provide a staged or graduated entry into a workpiece. The fastener comprises a shank section formed with an integral driving head at one end and a tapered or conical point section at the other end, and a raised helical thread extending from near the tip of the conical point substantially throughout the length of the point and shank sections. The diameter of the thread increases gradually from the point tip along the length of the conical surface and then decreases in diameter – or increases at a lesser degree – as it approaches the cylindrical shank section.

The fastener may also comprise a second raised helical thread, parallel to and lying within the first thread and extending from near the junction of the conical point section and the cylindrical shank section substantially throughout the length of the shank. The leading edge of the second thread extends part-way down the conical point and overlaps axially the decreasing diameter portion of the first thread.

A modified version of the present invention includes a screw of the type described with a relatively short lead screw formed on the point near the tip and a substantial gap with no threads along the conical point surface leading to the shank section. This modification is intended primarily for joining lamina together.

3 Claims, 13 Drawing Figures

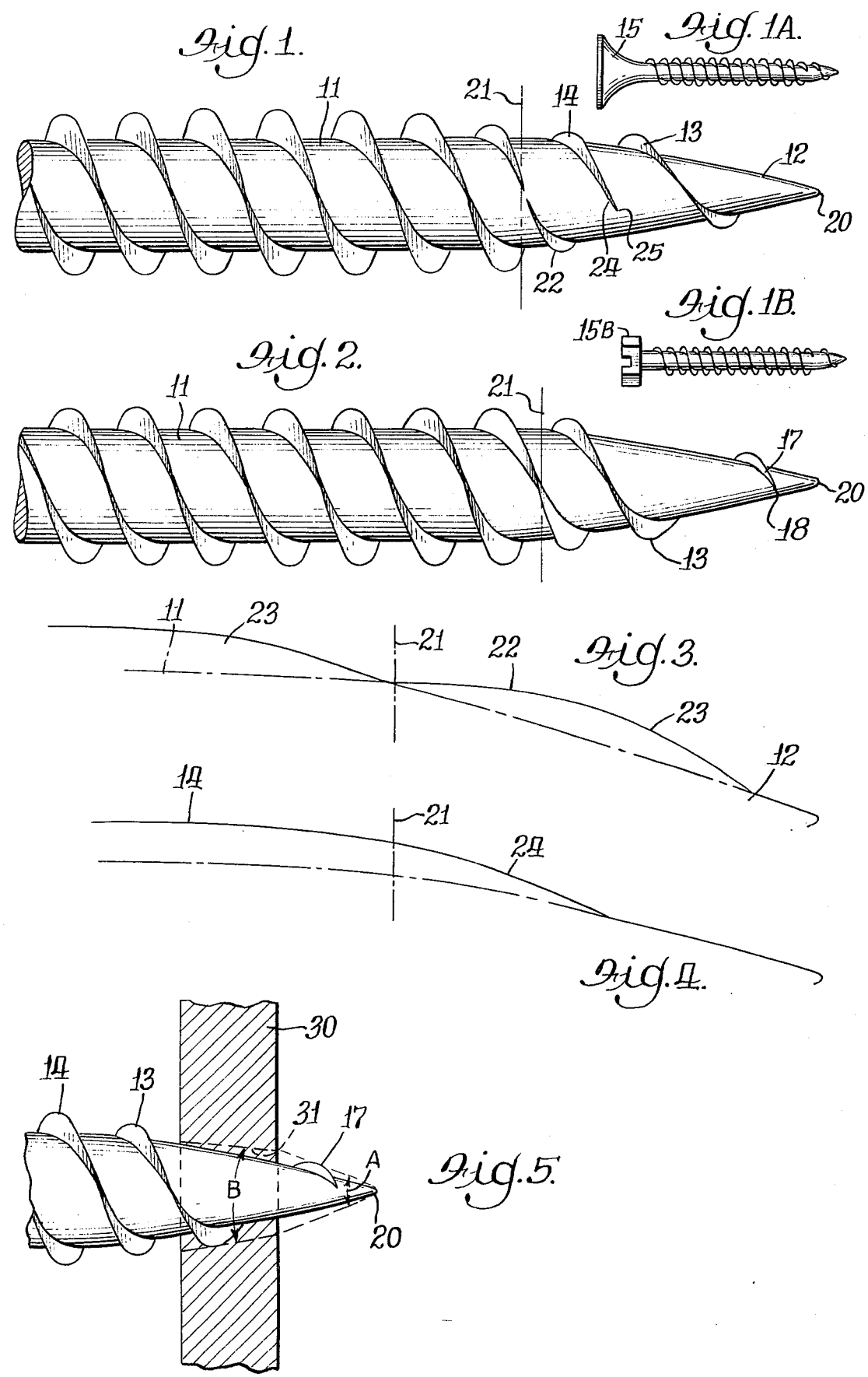

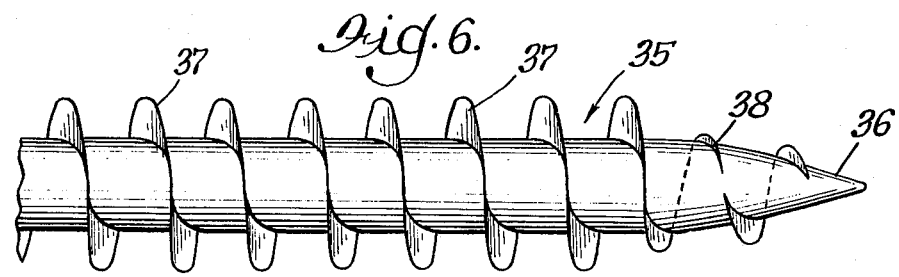
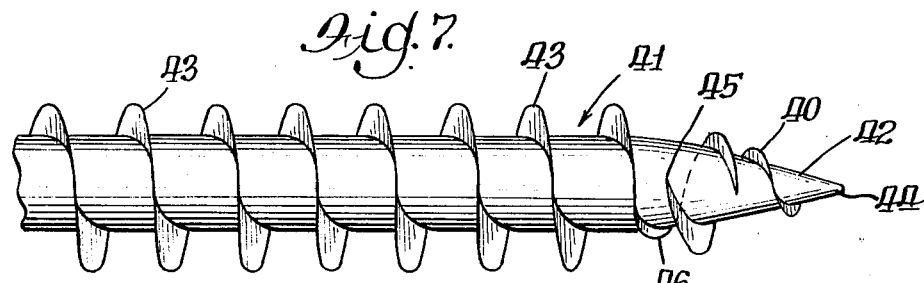
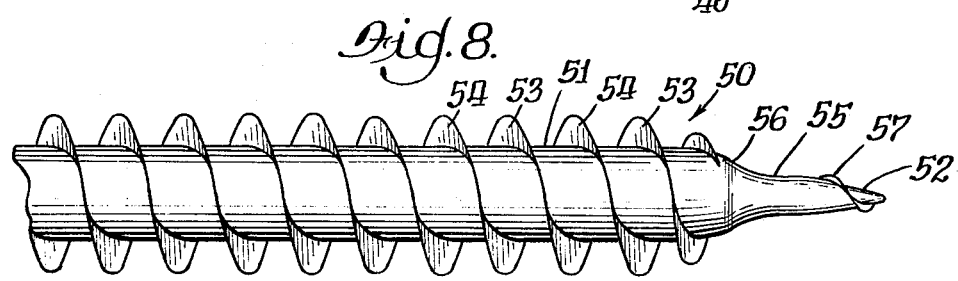
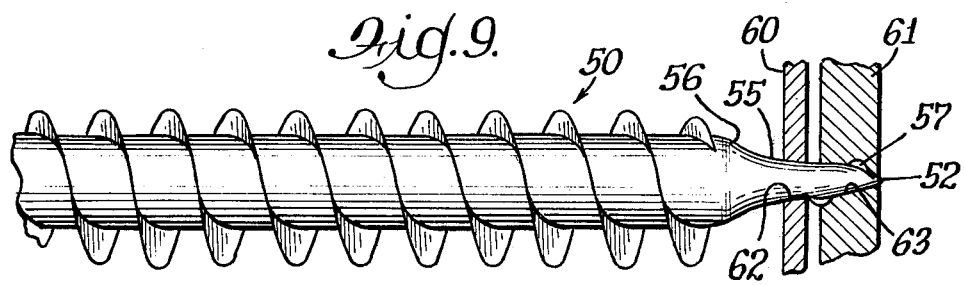
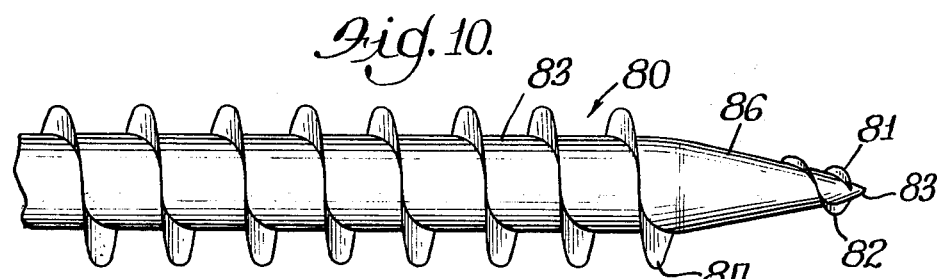
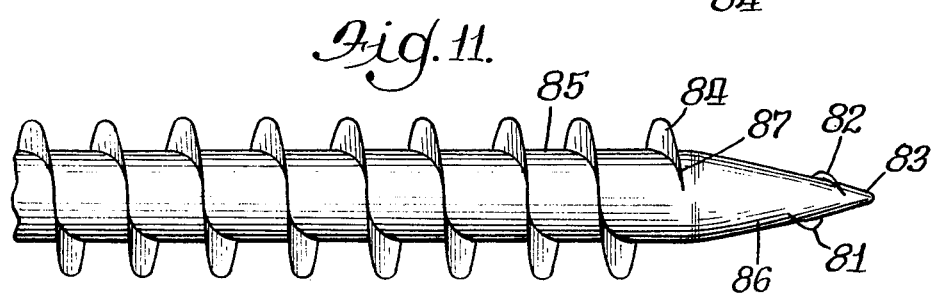

SELF-TAPPING SCREW FASTENER WITH IMPROVED THREAD CONSTRUCTION

BACKGROUND OF THE INVENTION

1. Field of the Invention

The present invention relates generally to Driven, Headed, and Screw-Threaded Fastenings, and more particularly to screws with roll-formed threads. Still more specifically, the screws herein are of the self-threading type capable of penetrating a workpiece to form their own opening, and thereafter enlarging and threading that opening to make a firm engagement therewith. The type of screws defined herein may be most useful in the field of dry-wall construction, or in joining together two sheets of metal material, but are not limited thereto.

2. Description of the Prior Art

The self-threading screws of the prior art most generally comprise a cylindrical shank portion formed on one end with an enlarged integral head and at the other end with a tapered point. One or more parallel, helical threads are formed, by rolling or cutting, on the external surface of the shank portion and extend down to the tip of the point. The external diameter of the threads increases from the tip up the tapered portion of the point, and remains uniform along the length of the shank portion.

A typical application for such a screw is the attachment of a sheet of Gypsum board to upright metal or wooden studs. After penetrating the board, which is relatively soft, the tip of the screw contacts and penetrates the stud. The threads formed on the point engage the periphery of the opening made by the tip and drive the screw further into the stud. the tapered point and expanding threads cause the opening to enlarge further as the screw advances until the opening is of the same diameter as the shank portion.

The stud or workpiece offers resistance to penetration by the point of the screw and this resistance increases as the conical point advances. This increase in resistance is due to two factors: first, the material of which the workpiece is comprised frequently work-hardens as the screw penetrates; and second, as the diameter of the opening increases, the torque radius for frictional resistance increases correspondingly. The combined effect of this resistance might cause binding, or stripping of the threads on the screw or of the threads formed within the workpiece opening, or otherwise damage the screw.

SUMMARY OF THE INVENTION

It is an object ofthe present invention to provide a screw fastener having improved thread construction that is adapted to perform the entry into a workpiece in graduated stages. The screw fastener has a first screw thread which makes initial penetration into the workpiece, enlarging the opening a pre-determined amount. The outer diameter of the leading edge of the first screw thread decreases — or increases at a lesser rate — as the thread nears the shank portion of the screw. This permits the screw to penetrate with lesser resistance into the workpiece.

It is also an object to provide a screw fastener, as described, having a second screw thread lying within and parallel to the first thread. The leading edge of the second thread is set back axially from the tip and commences at a point near the juncture of the shank portion and the conical point portion. The leading edge of the second screw thread may overlap axially the decreasing diameter portion of the first thread. This permits the second thread to engage the workpiece at a time of minimal resistance to the first thread.

It is also an object of the present invention to provide a screw fastener of the type described having a relatively short lead screw on the tip and a substantial gap along the conical surface adjacent the shank portion. This modification is intended for use in joining together two thin sheets of material. The lead screw penetrates the first sheet and then engages the second sheet. The enlarging, unthreaded conical point forces the first sheet into contact with the second sheet which is held by the lead screw. The main threads on the shank then engage and penetrate both sheets joining them together.

BRIEF DESCRIPTION OF THE DRAWINGS

FIG. 1 is a fragmentary side elevation view of a screw fastener constructed to exemplify the principles of the present invention;

FIG. 1A is a reduced side elevation view of a complete screw fastener of FIG. 1 formed with a "bugle" head;

FIG. 1B is a view similar to FIG. 1A showing a screw fastener with a "hex" or slotted head;

FIG. 2 is a view of the screw fastener of FIG. 1 rotated 180° about its own axis;

FIG. 3 is a diagrammatic view of the envelope of a first screw thread of the fastener of FIG. 1 laid out to illustrate the maximum diameter of the first thread with respect to the shank and conical point;

FIG. 4 is a companion view of the envelope of a second screw thread illustrated in the manner of FIG. 3;

FIG. 5 is a schematic view of the screw fastener of FIG. 1 as used to penetrate a workpiece;

FIG. 6 is a side elevation view of a single lead screw fastener incorporating part of the present invention;

FIG. 7 is a view of a single lead screw fastener formed with a double lead point;

FIG. 8 is a view of a modified double lead screw fastener having a pilot screw formed only on its point;

FIG. 9 is a view of the fastener of FIG. 8 as used to join together two sheets of material;

FIG. 10 is a view of a single lead screw with a double lead pilot screw formed only on its point; and FIG. 11 is a view of the fastener of FIG. 10 rotated 90° about its own axis.

DETAILED DESCRIPTION OF THE DRAWINGS

The improved screw fastener of the present invention is shown in fragmentary form in FIGS. 1 and 2 and is designated generally by the numeral 10. The screw 10 comprises: an elongated cylindrical shank portion 11, a conical point portion 12, a first raised screw thread 13, a second raised screw thread 14, and an integral head 15. The head 15 may be any desired conventional form such as the bugle head shown in FIG. 1A, or a slotted or hex head 15B, as shown in FIG. 1B.

The screw 10 is most commonly formed from soft steel wire that is cut to the desired length, the head formed by compression of one end of the wire blank in a forming die, and the desired threads and point roll-formed on the exterior of the blank. The completely formed screw is then heat-treated to a suitable hardness, and coated or plated as desired. Other metals or materials may also be used as based material without departing from the scope of the invention.

The first thread 13 has a leading edge 17 which extends from a point 18 near the tip 20 of the conical point 12 in the form of a helix around the point 12. The thread 13 gradually increases in diameter along the point 12 until it nears the juncture 21 of the conical point 12 with the cylindrical shank portion 11. Between an approximate point 22 and the juncture 21, the thread 13 decreases in diameter with respect to the conical surface of the point 12 and may go to zero at the juncture 21.

The envelope 23 for the thread 13 is illustrated in FIG. 3 in relation to the conical point 12. It can be seen from this figure that the maximum diameter of the thread 13 starts to decrease at about the point 22 and nears zero at the juncture 21. The thread diameter again rises beyond the juncture 21 and remains substantially uniform along the length of the shank 11.

The second thread 14 has a leading edge 24 that extends from a point 25 on the conical surface 12 in the form of a helix around the remaining conical surface 12 and the shank portion 11. The point 25 is axially more remote from the tip 20 than the point 18 and is relatively near the juncture 21. The thread 14 increases in diameter with respect to the conical surface 12 and remains constant along the length of the shank 11. The thread 14 preferably lies equidistant within and parallel to the first thread 13 and preferably also is indentical to the thread 13, although precise identity is not required for the purposes of this invention.

The envelope 26 for the thread 14 is illustrated in FIG. 4 and it can be seen that the leading edge 24 of the thread 14 overlaps axially the decreasing diameter portion of the thread 13.

The improved structure of the present invention can be understood by explanation of its operation with respect to a workpiece 30, as shown in FIG. 5. The tip 20 of the point 12 and leading edge 17 of the thread 13 make initial penetration through the workpiece 30 to form an opening 31.

The overall included angle of the tip 20 and thread lead 17 is designated as A in FIG. 5. After tip 20 and leading edge 17 have passed through the workpiece 30, the portion 22 of decreasing diameter of thread 13 enters the opening 31. The advancing screw 10 continues to enlarge the opening 31, but at a lesser rate as indicated by the included angle B. This permits the screw 10 to advance with lesser resistance until the leading edge 24 of the thread 14 engages the opening 31. The screw 10 then advances in a conventional manner.

The structure defined permits the screw 10 to make a staged entry into the workpiece 30. The tip 20 and leading edge 17 of the thread 13 penetrate and engage the workpiece to form the opening 31 and make a firm attachment before the thread 14 enters the opening 31. The resistance to penetration by the tip 20 and leading edge 17 is reduced by the decreasing diameter portion 22 of the thread 13. This is particularly important when fastening to metal studs or workpieces because the metal comprising the workpiece frequently work-hardens under pressure and deformation. In addition, as the opening 31 enlarges due to penetration of the point 12, the torque radius for frictional resistance increases proportionally. The structure defined permits penetration of the point 12 with minimal resistance until the main body of the screw 10 engages the walls of the opening 31.

The improved structure of the present invention can also be used to advantage in conjunction with a single lead, or type "A" screw, as shown in FIG. 6. In this embodiment, a screw 35 is formed with a point 36 and a single thread 37. The thread 37 is reduced in diameter at 38 to allow a stage penetration of the point 36, as previously described.

The single lead screw fastener of FIG. 6 can be further improved by the addition of a second lead screw 40, as shown in FIG. 7. In this embodiment, a screw 41 has a point 42 and a primary thread 43. The lead screw 40 is formed only on the point 42 and extends from near the tip 44 and fades out at 45 before reaching the juncture of the point 42 and shank of the screw 41. The primary thread 43 may be reduced in diameter also, as shown at 46, if desired, to further reduce the resistance of penetration into a workpiece. The lead screw 40 lies within and parallel to the helix defined by the thread 43. This ensures that the thread 43 will cut a new groove in the wall of the opening in a workpiece following penetration by the thread 40.

The principles of the present invention can also be employed to advantage in joining together two sheets or lamina of material. A modified structure for this purpose is shown in FIGS. 8 – 11. This embodiment comprises a screw fastener 50 having a main shank portion 51, a point 52, and raised threads 53 and 54. The point 52 has a shank portion 55, which is shown as sharply tapered for purposes of description, and a fluted skirt 56, A small and relatively short pilot screw thread 57 is formed on the tip of the point 52. No threads are formed on the exterior of the shank portion 55 between the pilot screw 57 and the fluted skirt 56.

Referring to FIG. 9, the screw fastener 50 is shown as intended to be used for joining together two sheets of material 60 and 61. In operation, a driven screw 50 first penetrates the sheet 60 forming an opening 62. The tip 52 and pilot screw 57 then penetrate the sheet 61 forming an opening 63. The screw 57 engages and holds the sheet 61 as the screw 50 advances. The shank 55 of the point 52 rotates within the opening 62 of the sheet 60. The gradually tapered shank 55 and fluted skirt 56 force the sheet 60 into contact with the sheet 61 as the screw 50 continues to turn. Before the pilot screw 57 completely penetrates the sheet 61, the main threads 53 and 54 penetrate the openings 62 and 63 joining the sheets 60 and 61 which have previously been pressed together. It is to be understood that the lengths of the pilot screw 57 and shank 55 for a particular screw 50 will be established for particular thicknesses of material to be joined.

The embodiment of FIGS. 10 and 11 is shown as a single lead screw 80 formed with double lead pilot screw threads 81 and 82 on a point 83, a main shank portion 84 and a single raised main thread 85. The point 83 has a tapered shank portion 86 without threads between the pilot screw threads 81 and 82 and the leading edge 87 of the main thread 85. The double pilot screws 81 and 82 provide better initial engagement for joining two sheets together and the single lead main thread 85 offers less resistance to penetration by the main shank portion 84. The unthreaded tapered shank portion 86 of the point 83 provides pressure for joining a second sheet to a first as previously described.

The invention is not to be considered as limited to the embodiments shown and described, except in-so-far as the claims may be so limited.

I claim:

1. A screw fastener element having an integral elongate shank portion formed with a driving head at one end and a conical point portion at the other end and adapted to provide a stage penetration into a workpiece, the improved thread construction comprising:

a first raised helical thread formed on the exterior of the conical point and shank portions and having a generally uniform thread height throughout the length of said shank portion, and having a leading edge extending from near the tip of the conical point and a gradually increasing thread height throughout a portion of the axial length of the conical point; and said thread height on said conical point decreasing in elevation relative to the increasing diameter of the conical point and diminishing substantially to zero elevation adjacent the juncture of said shank and conical point portions.

2. The screw fastener element of claim 1 including:

a second raised helical thread formed on the exterior of the shank portion and lying within and parallel to said first thread and having a thread height substantially equal to the thread height of said first thread on said shank portion, and also having a leading edge extending from near the juncture of said shank and conical point portions.

3. The screw fastener element of claim 2 wherein:

said leading edge of said second helical thread commences on said conical point portion and overlaps axially the decreasing elevation portion of said first thread.

* * * * *